United States Patent
Li et al.

(10) Patent No.: US 11,964,655 B2
(45) Date of Patent: Apr. 23, 2024

(54) BACKWARD ANTI-COLLISION DRIVING DECISION-MAKING METHOD FOR HEAVY COMMERCIAL VEHICLE

(71) Applicant: SOUTHEAST UNIVERSITY, Nanjing (CN)

(72) Inventors: Xu Li, Nanjing (CN); Weiming Hu, Nanjing (CN); Jinchao Hu, Nanjing (CN); Xuefen Zhu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 232 days.

(21) Appl. No.: 17/766,870

(22) PCT Filed: Apr. 12, 2021

(86) PCT No.: PCT/CN2021/086570
§ 371 (c)(1),
(2) Date: Apr. 6, 2022

(87) PCT Pub. No.: WO2022/126940
PCT Pub. Date: Jun. 23, 2022

(65) Prior Publication Data
US 2023/0182725 A1    Jun. 15, 2023

(30) Foreign Application Priority Data
Dec. 20, 2020    (CN) .......................... 202011512719.5

(51) Int. Cl.
*B60W 30/095*    (2012.01)
*G06N 3/045*    (2023.01)
*G06N 3/0464*    (2023.01)

(52) U.S. Cl.
CPC ......... *B60W 30/0956* (2013.01); *G06N 3/045* (2023.01); *G06N 3/0464* (2023.01);
(Continued)

(58) Field of Classification Search
CPC ......... B60W 30/0956; B60W 60/0015; B60W 60/0059; B60W 2554/80;
(Continued)

(56) References Cited

U.S. PATENT DOCUMENTS

| 6,150,932 A * | 11/2000 | Kenue | B60Q 9/008 340/904 |
| 6,690,413 B1 * | 2/2004 | Moore | B60R 1/025 348/E7.086 |

(Continued)

FOREIGN PATENT DOCUMENTS

| CN | 108583571 A | 9/2018 |
| CN | 110027553 A | 7/2019 |

(Continued)

OTHER PUBLICATIONS

Ding et al., "Multi-vehicle Coordinated Lane Change Strategy in the Roundabout under Internet of Vehicles based on Game Theory and Cognitive Computing," IEEE Transactions on Industrial Informatics, vol. 14, No. 8, Aug. 2015, 8 pages.

*Primary Examiner* — Andrew Joseph Rudy
(74) *Attorney, Agent, or Firm* — Muncy, Geissler, Olds & Lowe, P.C.

(57) ABSTRACT

The present invention discloses a backward anti-collision driving decision-making method for a heavy commercial vehicle. Firstly, a traffic environment model is established, and movement state information of a heavy commercial vehicle and a vehicle behind the heavy commercial vehicle is collected. Secondly, a backward collision risk assessment model based on backward distance collision time is established, and a backward collision risk is accurately quantified. Finally, a backward anti-collision driving decision-making problem is described as a Markov decision-making process under a certain reward function, a backward anti-collision driving decision-making model based on deep reinforce- (Continued)

ment learning is established, and an effective, reliable and adaptive backward anti-collision driving decision-making policy is obtained. The method provided by the present invention can overcome the defect of lack for research on the backward anti-collision driving decision-making policy for the heavy commercial vehicle in the existing method, can quantitatively output proper steering wheel angle and throttle opening control quantities, can provide effective and reliable backward anti-collision driving suggestions for a driver, and can reduce backward collision accidents.

1 Claim, 2 Drawing Sheets (52) U.S. Cl.
CPC . *B60W 2300/125* (2013.01); *B60W 2420/408* (2024.01); *B60W 2554/4041* (2020.02); *B60W 2554/80* (2020.02)

(58) Field of Classification Search
CPC ...... B60W 2420/408; B60W 2300/125; G06N 3/045; G06N 3/046
USPC ............... 701/23–28, 300–302, 400–541; 348/113–119

See application file for complete search history.

(56) References Cited

U.S. PATENT DOCUMENTS

| | | | | |
|---|---|---|---|---|
| 7,848,886 | B2* | 12/2010 | Kawasaki | G06V 20/58 |
| | | | | 701/301 |
| 8,812,226 | B2* | 8/2014 | Zeng | G01S 13/931 |
| | | | | 382/103 |
| 10,627,640 | B2* | 4/2020 | Nagahama | G02B 7/1822 |
| 11,242,050 | B2* | 2/2022 | Bouton | G06V 10/764 |
| 11,643,076 | B2* | 5/2023 | Liu | B60W 10/18 |
| | | | | 701/301 |
| 11,702,071 | B2* | 7/2023 | Kim | G05D 1/021 |
| | | | | 701/26 |
| 11,731,649 | B2* | 8/2023 | Hwang | G01C 21/16 |
| | | | | 701/23 |
| 2020/0239029 | A1 | 7/2020 | Kim et al. | |
| 2021/0096576 | A1* | 4/2021 | Grigorescu | G05D 1/0221 |

FOREIGN PATENT DOCUMENTS

| | | |
|---|---|---|
| CN | 111696387 A | 9/2020 |
| CN | 112633474 A | 4/2021 |

* cited by examiner

BACKWARD ANTI-COLLISION DRIVING DECISION-MAKING METHOD FOR HEAVY COMMERCIAL VEHICLE

TECHNICAL FIELD

The present invention relates to an anti-collision driving decision-making method, in particular to a backward anti-collision driving decision-making method for a heavy commercial vehicle, belonging to the technical field of automobile safety.

BACKGROUND

As the main undertaker of road transportation, the safety status of commercial vehicles directly affects the safety of road transportation. Vehicle collision is the main accident form in the process of road transportation. Heavy commercial vehicles represented by dangerous goods transport tankers mostly contain flammable, explosive, highly toxic (for example, methanol and acrylonitrile) and dangerous chemicals. Compared with forward collision, backward collision is more likely to lead to tank damage, leading to serious consequences such as leakage, combustion and explosion of dangerous goods in the tank, and the secondary damage is far more than the damage caused by the collision accident itself and has a higher risk. As an important part of the active prevention and control of backward collision, driving decision-making can greatly reduce the frequency of traffic accidents caused by backward collision or reduce the damage caused by backward collision if it can warn the driver before the occurrence of backward collision accidents and remind the driver to take proper acceleration, lane change and other measures. Therefore, the research on the backward anti-collision driving decision-making method for the heavy commercial vehicle has important social significance and practical value for ensuring road traffic safety.

At present, there are standards, patents and documents on vehicle backward collision prevention. In terms of standards, the Ministry of Transport issued the transportation industry standard Performance Requirements and Test Procedures for Backward Collision Early Warning Systems of Commercial Vehicles, stipulating the performance of backward collision early warning systems mounted on commercial vehicles. However, it is only limited to a collision early warning level and does not involve backward anti-collision driving decision-making. In terms of patent documents, most of the research on backward collision prevention is for small passenger vehicles. Compared with passenger vehicles, heavy commercial vehicles have the characteristics of high centroid position, large load capacity and the like. In the process of sharp turn or emergency lane change, the shaking of the tank or trailer will further increase the instability of the vehicle, and the vehicle is very easy to lose stability and roll over. Therefore, it is difficult to apply a driving decision-making method for passenger vehicles to heavy commercial vehicles. Generally speaking, the existing research does not involve the backward anti-collision driving decision-making of heavy commercial vehicles, and especially there is a lack for research on backward anti-collision driving decision-making for heavy commercial vehicles, and the decision-making is effective, reliable and adaptive to traffic environment characteristics.

SUMMARY

Objectives of the invention: in order to realize a backward anti-collision driving decision-making method for a heavy commercial vehicle (the method is effective, reliable and adaptive to traffic environment characteristics), the present invention discloses a backward anti-collision driving decision-making method for a heavy commercial vehicle. The method can overcome the defect of lack for the backward anti-collision driving decision-making policy for the heavy commercial vehicle in the existing method, can quantitatively output proper steering wheel angle and throttle opening control quantities, can provide effective and reliable backward anti-collision driving suggestions for a driver, and can realize backward anti-collision driving decision-making for the heavy commercial vehicle (the decision-making is effective, reliable and adaptive to the traffic environment).

Technical solutions: the present invention provides a backward anti-collision driving decision-making method based on deep reinforcement learning for heavy commercial vehicles, such as semi-trailer tankers and semi-trailer trains. Firstly, a virtual traffic environment model is established, and movement state information of a heavy commercial vehicle and a vehicle behind the heavy commercial vehicle is collected. Secondly, a backward collision risk assessment model based on backward distance collision time is established, and a backward collision risk is accurately quantified. Finally, a backward anti-collision driving decision-making problem is described as a Markov decision-making process under a certain reward function, a backward anti-collision driving decision-making model based on deep reinforcement learning is established, and an effective, reliable and adaptive backward anti-collision driving decision-making policy is obtained. The method includes the following steps:

Step I: A Virtual Traffic Environment Model is Established.

In order to reduce the frequency of traffic accidents caused by backward collision and improve the safety of heavy commercial vehicles, the present invention provides a backward anti-collision driving decision-making method, and the method is applicable to the following scenario: there are no obstacles and other interference factors in front of a heavy commercial vehicle during the running of the vehicle, and in order to prevent backward collision with a vehicle behind, a decision-making policy such as acceleration and steering should be effectively provided for a driver in time to avoid collision accidents.

In the actual road test process, the relevant tests of heavy commercial vehicles have high test cost and risk. In order to reduce the test cost and risk while taking into account the test efficiency, the present invention establishes a virtual traffic environment model for high-class highways, that is, a three-lane virtual environment model including straight lanes and curved lanes. The heavy commercial vehicle moves in the traffic environment model, and a target vehicle (including 3 types: small, medium and large vehicles) follows the heavy commercial vehicle, and in the process, there are 4 different running conditions, including acceleration, deceleration, uniform velocity and lane change.

Movement state information can be obtained in real time through a centimeter-level high-precision differential GPS, an inertia measurement unit and a millimeter wave radar mounted on each vehicle, including positions, velocity, acceleration, relative distance and relative velocity of the two vehicles. A type of the target vehicle can be obtained in real time through a visual sensor mounted at a rear part of the vehicle. Drivers control information can be read through a CAN bus, including throttle opening and steering wheel angle of the vehicle.

In the present invention, the target vehicle refers to a vehicle located behind the heavy commercial vehicle on a running road, located within the same lane line, running in the same direction and closest to the heavy commercial vehicle.

Step II: A Backward Collision Risk Assessment Model is Established.

In order to properly and effectively output the backward anti-collision decision-making policy, it is necessary to accurately assess the backward collision risk level of the heavy commercial vehicle in real time. Firstly, time required for collision between the heavy commercial vehicle and the target vehicle is calculated:

$$RTTC(t) = -\frac{x_c(t)}{v_r(t)} \quad (1)$$

in formula (1), RTTC(t) represents backward distance collision time at time t in unit of second, $x_c(t)$ represents vehicle distance in unit of meter, $v_F(t)$ and $v_R(t)$ respectively represent the velocity of the heavy commercial vehicle and the target vehicle, $v_r(t)$ represents the relative velocity of the two vehicles in unit of meter per second, and $v_r(t)=v_F(t)-v_R(t)$.

Secondly, a backward collision risk level is calculated. According to the national standard Performance Requirements and Test Procedures for Backward Collision Early Warning Systems of Commercial Vehicles, when the backward distance collision time is not less than 2.1 seconds and not more than 4.4 seconds, a backward collision alarm is given, indicating that a backward collision early warning system has passed a test. Based on this, the backward collision risk level is quantified:

$$\delta_w = \frac{RTTC(t) - 2.1}{4.4 - 2.1} \quad (2)$$

in formula (2), $\delta_w$ represents a quantified value of a backward collision risk. When $\delta_w \geq 1$, it indicates that there is no backward collision risk; when $0.5 \leq \delta_w \leq 1$, it indicates that there is a backward collision risk; and when $0 \leq \delta_w \leq 0.5$, it indicates that the backward collision risk level is very high.

Step III: A Backward Anti-Collision Driving Decision-Making Model of the Heavy Commercial Vehicle is Established.

In order to realize backward anti-collision driving decision-making (the decision-making is effective, reliable and adaptive to the traffic environment), the present invention comprehensively considers the influence of traffic environment, vehicle operation state, rear vehicle type and backward collision risk level on backward collision, and establishes a backward anti-collision driving decision-making model of the heavy commercial vehicle.

Common driving decision-making methods include rule-based and data-learning-based decision-making algorithms. (1) The rule-based decision-making algorithm uses a finite directed connected graph to describe different driving states and the transition relationship between states, so as to generate driving actions according to the migration of driving states. However, in the process of vehicle movement, there are uncertainties in vehicle movement parameters, road conditions and rear traffic conditions. The prepared rules are difficult to traverse all scenarios and ensure the effectiveness and adaptability of decision-making. (2) The data-learning-based decision-making algorithm uses an algorithm to imitate the learning process of human to knowledge or skills, so as to realize the continuous improvement of its own learning performance through an interactive self-learning mechanism. The method based on deep reinforcement learning combines the perception ability of deep learning with the decision-making ability of reinforcement learning to meet the adaptability of anti-collision decision-making to the traffic environment and running conditions due to adaptability to an uncertain problem. Therefore, the present invention adopts the deep reinforcement learning algorithm to establish the backward anti-collision driving decision-making model.

The decision-making methods based on deep reinforcement learning mainly include decision-making methods based on value function, policy search and Actor-Critic architecture. The deep reinforcement learning algorithm based on value cannot deal with the problem of continuous output, and cannot meet the need of continuous output of driving policies in anti-collision decision-making. The method based on policy search has the defects that it is sensitive to step size and difficult to choose step size, etc. The decision-making method based on Actor-Critic architecture combines value function estimation and policy search, and is fast in update speed. Proximate Policy Optimization (PPO) solves the problems of slow parameter update and difficulty in determining the step size, and achieves good results in outputting continuous action spaces. Therefore, the present invention adopts a PPO algorithm to establish the backward anti-collision driving decision-making model, and obtains the optimal backward anti-collision decision through interactive iterative learning with a target vehicle movement random process model. This step specifically includes the following 4 sub-steps:

Sub-Step 1: Basic Parameters of the Backward Anti-Collision Driving Decision-Making Model are Defined.

Firstly, a backward anti-collision driving decision-making problem is described as a Markov decision-making process (S,A,P,r) under a certain reward function, wherein S is a state space, A is a backward anti-collision action decision, P is a state transition probability caused by movement uncertainty of the target vehicle, and r is a reward function. Secondly, basic parameters of the Markov decision-making process are defined specifically as follows:

(1) A State Space is Defined.

A state space expression is established by using the vehicle movement state information output in step I and the backward collision risk level output in step II:

$$S_t = (v_{F\_lon}, a_{F\_lon}, v_{r\_lon}, a_{r\_lon}, \theta_{str}, p_{thr}, L_r, \delta_w, T_m) \quad (3)$$

in formula (3), $S_t$ represents a state space at time t, $v_{F\_lon}$ and $v_{r\_lon}$ respectively represent the longitudinal velocity of the heavy commercial vehicle and the relative longitudinal velocity of the two vehicles in unit of meter per second, $a_{F\_lon}$ and $a_{r\_lon}$ respectively represent the longitudinal acceleration of the heavy commercial vehicle and the relative longitudinal acceleration of the two vehicles in unit of meter per square second, $\theta_{str}$ represents a steering wheel angle of the vehicle in unit of degree, $p_{thr}$ represents a throttle opening in unit of percentage, $L_r$ represents a relative vehicle distance in unit of meter, $\delta_w$ and $T_m$ respectively represent the backward collision risk level and the type of the target vehicle, m=1, 2, 3 respectively represent that the target vehicle is a large vehicle, a medium vehicle and a small vehicle, and $T_m$=m in the present invention.

(2) An Action Decision is Defined.

In order to comprehensively consider the influence of transverse movement and longitudinal movement on backward collision, the present invention defines a driving policy, that is, an action decision output by the decision-making model, by using the steering wheel angle and the throttle opening as control quantities in the present invention:

$$A_t=[\theta_{str\_out}, p_{thr\_out}] \quad (4)$$

in formula (4), $A_t$ represents an action decision at time t, $\theta_{str\_out}$ represents a normalized steering wheel angle control quantity in a range of [−1, 1], and $P_{thr\_out}$ represents a normalized throttle opening control quantity in a range of [0, 1]. When $p_{thr\_out}$=0, it indicates that the vehicle does not accelerate, and when $\delta_{brake}$=1, it indicates that the vehicle accelerates at a maximum acceleration.

(3) A Reward Function is Established.

In order to evaluate the advantages and disadvantages of the action decision, a reward function is established to concretize and digitalize the evaluation. Considering that backward anti-collision driving decision-making is a multi-objective optimization problem involving safety, comfort and other objectives, the present invention designs the reward function as follows:

$$r_t=r_1+r_2+r_3 \quad (5)$$

in formula (5), $r_t$ represents a reward function at time t, $r_1$ represents a safety distance reward function, $r_2$ represents a comfort reward function, and $r_3$ represents a penalty function.

Firstly, a safety distance reward function $r_1$ is designed:

$$r_1 = \begin{cases} \omega_d(L_r - L_s) & L_r \geq L_s \\ 0 & L_r > L_s \end{cases} \quad (6)$$

in formula (6), $L_r$ and $L_s$ respectively represent relative vehicle distance and a safety distance threshold, and $\omega_d$ represents a safety distance weight coefficient valued as $\omega_d$=0.85 in the present invention.

Secondly, in order to ensure the driving comfort of the vehicle, excessive impact should be avoided as much as possible, and a comfort reward function $r_2$ is designed:

$$r_2=\omega_j|a_{F\_lon}(t+1)-a_{F\_lon}(t)| \quad (7)$$

in formula (7), $\omega_j$ is a comfort weight coefficient valued as $\omega_j$=0.95 in the present invention.

Finally, a penalty function $r_3$ is designed:

$$r_3 \begin{cases} -100, & \text{collision} \\ -100, & \text{rollover} \\ 0, & \text{no collision or rollover} \end{cases} \quad (8)$$

(4) An Expected Maximum Policy is Designed.

$$\pi^* = \underset{\pi_\theta}{\arg\max} E_{\tau(\pi_\theta)}\left[\sum_{t=0}\gamma_t r_t\right] \quad (9)$$

in formula (9), $\pi^*$ is an expected maximum policy, $\pi$ is a backward anti-collision decision-making policy, $\gamma$ is a discount factor, $\gamma \in (0,1)$, and $\tau(\pi)$ represents trajectory distribution under policy $\pi$.

Sub-Step 2: A Network Architecture of the Backward Anti-Collision Driving Decision-Making Model is Designed.

A backward anti-collision driving decision-making network is set up by using an "Actor-Critic" network framework, including an Actor network and a Critic network. The Actor network uses state space information as an input and outputs an action decision, that is, the throttle opening and steering wheel angle control quantities of the heavy commercial vehicle. The Critic network uses the state space information and the action decision as an input and outputs a value of current "state-action". The process is specifically as follows:

(1) An Actor Network is Designed.

A hierarchical coder structure is established, and features of various information in the state space are respectively extracted. Firstly, 3 serially connected convolution layers ($C_{F1}$, $C_{F2}$, $C_{F3}$) and 1 maximum pooling layer ($P_1$) are constructed, features of the movement state information (longitudinal velocity, longitudinal acceleration, steering wheel angle, and throttle opening) of the vehicle are extracted, and they are coded into an intermediate feature vector $h_1$; features of the relative movement state information (relative longitudinal velocity, relative longitudinal acceleration, and relative vehicle distance) of the two vehicles are extracted by using the same structure, that is, 3 serially connected convolution layers ($C_{R1}$, $C_{R2}$, $C_{R3}$) and 1 maximum pooling layer ($P_2$), and they are coded into an intermediate feature vector $h_2$; and features of the collision risk level and the type of the target vehicle are extracted by using a convolution layer $C_{W1}$ and a maximum pooling layer $P_3$, and they are coded into an intermediate feature vector $h_3$. Secondly, the features $h_1$, $h_2$ and $h_3$ are combined and full connection layers $FC_4$ and $FC_5$ are connected to output the action decision.

The number of neurons of the convolution layers $C_{F1}$, $C_{F2}$, $C_{F3}$, $C_{R1}$, $C_{R2}$, $C_{R3}$ and $C_{W1}$ is set to be 20, 20, 10, 20, 20, 10 and 20 respectively; and the number of neurons of the full connection layers $FC_4$ and $FC_5$ is set to be 200. The activation function of each convolution layer and full connection layer is a Rectified Linear Unit (ReLU), and an expression thereof is $f(x)=\max(0,x)$ (2) A Critic Network is Designed.

A critic network is established by using a neural network with a multiple hidden layer structure. Firstly, a state space $S_t$ is input into a hidden layer $FC_{C1}$; and at the same time, an action decision $A_t$ is input into a hidden layer $FC_{C2}$. Secondly, the hidden layers $FC_{C1}$ and $FC_{C2}$ are combined by tensor addition. Finally, after passing through the full connection layers $FC_{C3}$ and $FC_{C4}$ sequentially, a value of the Critic network is output.

The number of neurons of the layers $FC_{C1}$ and $FC_{C2}$ is set to be 400, the number of neurons of other hidden layers is set to be 200, and the activation function of each layer is an ReLU.

Sub-Step 3: The Backward Anti-Collision Driving Decision-Making Model is Trained.

Gradient updating is performed to the network parameters by using loss functions $J_{actor}$ and $J_{critic}$. A specific training process is as follows:

Sub-step 3.1: the Actor network and the Critic network are initialized.

Sub-step 3.2: iterative solution is performed, wherein each iteration includes sub-step 3.21 to sub-step 3.4 specifically as follows:

Sub-step 3.21: iterative solution is performed, wherein each iteration includes sub-step 3.211 to sub-step 3.213 specifically as follows:

Sub-step 3.211: a movement control operation of the vehicle is obtained by using the virtual traffic environment model in step I.

Sub-step 3.212: sample data $(S_t, A_t, r_t)$ are obtained by using the Actor network.

Sub-step 3.213: a cycle is ended to obtain a sample point set $[(S_1,A_1,r_1), (S_2,A_2,r_2), \ldots, (S_t,A_t,r_t)]$.

Sub-step 3.22: an advantage function is calculated:

$$\hat{F}_t = \sum_{t'>t} \gamma^{t'-1} r_{t'} - V(S_t) \qquad (10)$$

in formula (10), $\hat{F}_t$ represents an advantage function, $V(S_t)$ represents a value function of state $S_t$, $\hat{F}_t>0$ represents that the possibility of taking a current action should be increased, and $\hat{F}_t<0$ represents that the possibility of taking the action should be decreased.

Sub-step 3.23: iterative solution is performed, wherein each iteration includes sub-step 3.231 to sub-step 3.233 specifically as follows:

Sub-step 3.231: an objective function of the Actor network is calculated.

Sub-step 3.232: the parameter $J_{actor}$ of the Actor network is updated:

$$J_{actor} = \sum_{(s_1,a_1)} \min[p_t(\theta)\hat{F}_t, \text{clip}(p_t(\theta), 1-\varepsilon, 1+\varepsilon)\hat{F}_t] \qquad (11)$$

in formula (11), $p_t(\theta)$ represents a ratio of a new policy $\pi_\theta$ to an old policy $\pi_{\theta\_old}$ on action decision distribution in a policy updating process, $$p_t(\theta) = \frac{\pi_\theta(A_t \mid S_t)}{\pi_{\theta\_old}(A_t \mid S_t)},$$

clip(•) represents a clipping function, and $\varepsilon$ is a constant valued as $\varepsilon=0.25$ in the present invention.

Sub-step 3.233: the parameter $J_{critic}$ of the Critic network is updated:

$$J_{critic} = -\sum_{t=1}^{T}\left[\sum_{t'>t}\gamma^{t'-1}r_{t'} - V(S_t)\right]^2 \qquad (12)$$

Sub-step 3.234: a cycle is ended.

Sub-step 3.3: iterative updating is performed according to the method provided in sub-step 3.2 to make the Actor network and the Critic network converge gradually. In a training process, if the vehicle has a backward collision or rollover, a current round is terminated and a new round for training is started. When the iteration reaches the maximum number of steps or the model is capable of making a backward anti-collision driving decision stably and accurately, the training ends.

Sub-Step 4: The Decision-Making Policy is Output by Using the Backward Anti-Collision Decision-Making Model.

The information obtained by the centimeter-level high-precision differential GPS, the inertia measurement unit, the millimeter wave radar and the CAN bus is input into the trained backward anti-collision driving decision-making model, such that proper steering wheel angle and throttle opening control quantities are capable of being quantitatively output to provide an effective and reliable backward anti-collision driving suggestion for a driver, so as to realize effective, reliable and adaptive backward anti-collision driving decision-making of the heavy commercial vehicle.

Beneficial Effects

Compared with the existing technology, the technical solution of the present invention has the following beneficial technical effects, which are specifically embodied as follows:

(1) The method provided by the present invention realizes the backward anti-collision driving decision-making of the heavy commercial vehicle, and can provide an effective and reliable backward anti-collision driving decision-making policy for a driver.

(2) The method provided by the present invention comprehensively considers the influence of traffic environment, vehicle operation state, rear vehicle type and backward collision risk level on backward collision, and accurately quantifies the driving policy such as steering wheel angle and throttle opening in the form of numerical value. The output driving policy can be adjusted adaptively according to the traffic environment and drivers operation, thus improving the effectiveness, reliability and environmental adaptability of backward anti-collision driving decision-making of the heavy commercial vehicle.

(3) The method provided by the present invention does not need to consider complex vehicle dynamic equations and body parameters. The calculation method is simple and clear.

DETAILED DESCRIPTION

The technical solutions of the present invention are further described below with reference to the accompanying drawings.

Figure 1:
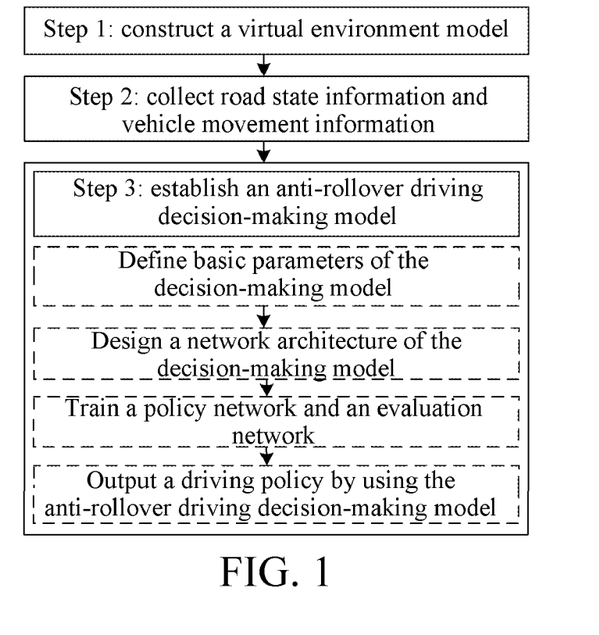
FIG. 1 is a schematic diagram of a technical route according to the present invention.

In order to establish a backward anti-collision decision-making policy (the policy is effective, reliable and adaptive to the traffic environment), and realize backward anti-collision driving decision-making of heavy commercial vehicles, so as to fill the blank of backward anti-collision driving decision-making technology of heavy commercial vehicles in practical application, the present invention provides a backward anti-collision driving decision-making method based on deep reinforcement learning for heavy commercial vehicles, such as semi-trailer tankers and semi-trailer trains. Firstly, a virtual traffic environment model is established, and movement state information of a heavy commercial vehicle and a vehicle behind the heavy commercial vehicle is collected. Secondly, a backward collision risk assessment model based on backward distance collision time is established, and a backward collision risk is accurately quantified. Finally, a backward anti-collision driving decision-making problem is described as a Markov decision-making process under a certain reward function, a backward anti-collision driving decision-making model based on deep reinforcement learning is established, and an effective, reliable and adaptive backward anti-collision driving decision-making policy is obtained. A technical route according to the present invention is as illustrated in FIG. 1. Specific steps are as follows:

Step I: A Virtual Traffic Environment Model is Established.

In order to reduce the frequency of traffic accidents caused by backward collision and improve the safety of heavy commercial vehicles, the present invention provides a backward anti-collision driving decision-making method, and the method is applicable to the following scenario: there are no obstacles and other interference factors in front of a heavy commercial vehicle during the running of the vehicle, and in order to prevent backward collision with a vehicle behind, a decision-making policy such as acceleration and steering should be effectively provided for a driver in time to avoid collision accidents.

In the actual road test process, the anti-collision tests of heavy commercial vehicles have high test cost and risk. In order to reduce the test cost and risk while taking into account the test efficiency, the present invention establishes a virtual traffic environment model for high-class highways, that is, a three-lane virtual environment model including straight lanes and curved lanes. The heavy commercial vehicle moves in the traffic environment model, and a target vehicle (including 3 types: small, medium and large vehicles) follows the heavy commercial vehicle, and in the process, there are 4 different running conditions, including acceleration, deceleration, uniform velocity and lane change.

Movement state information can be obtained in real time through a centimeter-level high-precision differential GPS, an inertia measurement unit and a millimeter wave radar mounted on each vehicle, including positions, velocity, acceleration, relative distance and relative velocity of the two vehicles. A type of the target vehicle can be obtained in real time through a visual sensor mounted at a rear part of the vehicle. Drivers control information can be read through a CAN bus, including throttle opening and steering wheel angle of the vehicle.

In the present invention, the target vehicle refers to a vehicle located behind the heavy commercial vehicle on a running road, located within the same lane line, running in the same direction and closest to the heavy commercial vehicle.

Step II: A Backward Collision Risk Assessment Model is Established.

In order to reasonably and effectively output the backward anti-collision decision-making policy, it is necessary to accurately assess the backward collision risk level of the heavy commercial vehicle in real time. Firstly, time required for collision between the heavy commercial vehicle and the target vehicle is calculated:

$$RTTC(t) = -\frac{x_c(t)}{v_r(t)} \qquad (1)$$

in formula (1), RTTC(t) represents backward distance collision time at time tin unit of second, $x_c(t)$ represents a vehicle distance in unit of meter, $v_F(t)$ and $v_R(t)$ respectively represent the velocity of the heavy commercial vehicle and the target vehicle, $v_r(t)$ represents the relative velocity of the two vehicles in unit of meter per second, and $v_r(t)=v_F(t)-v_R(t)$.

Secondly, a backward collision risk level is calculated. According to the national standard Performance Requirements and Test Procedures for Backward Collision Early Warning Systems of Commercial Vehicles, when the backward distance collision time is not less than 2.1 seconds and not more than 4.4 seconds, a backward collision alarm is given, indicating that a backward collision early warning system has passed a test. Based on this, the backward collision risk level is quantified:

$$\delta_w = \frac{RTTC(t) - 2.1}{4.4 - 2.1} \qquad (2)$$

in formula (2), $\delta_w$ represents a quantified value of a backward collision risk. When $\delta_w \geq 1$, it indicates that there is no backward collision risk; when $0.5 \leq \delta_w \leq 1$, it indicates that there is a backward collision risk; and when $0 \leq \delta_w \leq 0.5$, it indicates that the backward collision risk level is very high.

Step III: A Backward Anti-Collision Driving Decision-Making Model of the Heavy Commercial Vehicle is Established.

In order to realize backward anti-collision driving decision-making (the decision-making is effective, reliable and adaptive to the traffic environment), the present invention comprehensively considers the influence of traffic environment, vehicle operation state, rear vehicle type and backward collision risk level on backward collision, and establishes a backward anti-collision driving decision-making model of the heavy commercial vehicle.

Common driving decision-making methods include rule-based and data-learning-based decision-making algorithms. (1) The rule-based decision-making algorithm uses a finite directed connected graph to describe different driving states and the transition relationship between states, so as to generate driving actions according to the migration of driving states. However, in the process of vehicle movement, there are uncertainties in vehicle movement parameters, road conditions and rear traffic conditions. The prepared rules are difficult to traverse all scenarios and ensure the effectiveness and adaptability of decision-making. (2) The data-learning-based decision-making algorithm uses an algorithm to imitate the learning process of human to knowledge or skills, so as to realize the continuous improvement of its own learning performance through an interactive self-learning mechanism. The method based on deep reinforcement learning combines the perception ability of deep learning with the decision-making ability of reinforcement learning to meet the adaptability of anti-collision decision-making to the traffic environment and running conditions due to adaptability to an uncertain problem. Therefore, the present invention adopts the deep reinforcement learning algorithm to establish the backward anti-collision driving decision-making model.

The decision-making methods based on deep reinforcement learning mainly include decision-making methods based on value function, policy search and Actor-Critic architecture. The deep reinforcement learning algorithm based on value cannot deal with the problem of continuous output, and cannot meet the need of continuous output of driving policies in anti-collision decision-making. The method based on policy search has the defects that it is sensitive to step size and difficult to choose step size, etc. The decision-making method based on Actor-Critic architecture combines value function estimation and policy search, and is fast in update speed. Proximate Policy Optimization (PPO) solves the problems of slow parameter update and difficulty in determining the step size, and achieves good results in outputting continuous action spaces. Therefore, the present invention adopts a PPO algorithm to establish the backward anti-collision driving decision-making model, and obtains the optimal backward anti-collision decision through interactive iterative learning with a target vehicle movement random process model. This step specifically includes the following 4 sub-steps:

Sub-Step 1: Basic Parameters of the Backward Anti-Collision Driving Decision-Making Model are Defined.

Firstly, a backward anti-collision driving decision-making problem is described as a Markov decision-making process (s,A,P,r) under a certain reward function, wherein S is a state space, A is a backward anti-collision action decision, P is a state transition probability caused by movement uncertainty of the target vehicle, and r is a reward function. Secondly, basic parameters of the Markov decision-making process are defined specifically as follows:

(1) A State Space is Defined.

A state space expression is established by using the vehicle movement state information output in step I and the backward collision risk level output in step II:

$$S_t=(V_{F\_lon},a_{F\_lon},V_{r\_lon},a_{r\_lon},\theta_{str},p_{thr},L_r,\delta_w,T_m) \quad (3)$$

in formula (3), $S_t$ represents a state space at time t, $V_{F\_lon}$ and $V_{r\_lon}$ respectively represent the longitudinal velocity of the heavy commercial vehicle and the relative longitudinal velocity of the two vehicles in unit of meter per second, $a_{F\_lon}$ and $a_{r\_lon}$ respectively represent the longitudinal acceleration of the heavy commercial vehicle and the relative longitudinal acceleration of the two vehicles in unit of meter per square second, $\theta_{str}$ represents a steering wheel angle of the vehicle in unit of degree, $p_{thr}$ represents a throttle opening in unit of percentage, $L_r$ represents a relative vehicle distance in unit of meter, $\delta_w$ and $T_m$ respectively represent the backward collision risk level and the type of the target vehicle, m=1, 2, 3 respectively represent that the target vehicle is a large vehicle, a medium vehicle and a small vehicle, and $T_m$=m in the present invention.

(2) An Action Decision is Defined.

In order to comprehensively consider the influence of transverse movement and longitudinal movement on backward collision, the present invention defines a driving policy, that is, an action decision output by the decision-making model, by using the steering wheel angle and the throttle opening as control quantities in the present invention:

$$A_t=[\theta_{str\_out},p_{thr\_out}] \quad (4)$$

in formula (4), $A_t$ represents an action decision at time t, $\theta_{str\_out}$ represents a normalized steering wheel angle control quantity in a range of [−1, 1], and $p_{thr\_out}$ represents a normalized throttle opening control quantity in a range of [0, 1]. When $p_{thr\_out}$=0, it indicates that the vehicle does not accelerate, and when $\delta_{brake}$=1, it indicates that the vehicle accelerates at a maximum acceleration.

(3) A Reward Function is Established.

In order to evaluate the advantages and disadvantages of the action decision, a reward function is established to concretize and digitalize the evaluation. Considering that backward anti-collision driving decision-making is a multi-objective optimization problem involving safety, comfort and other objectives, the present invention designs the reward function as follows:

$$r_t=r_1+r_2+r_3 \quad (5)$$

in formula (5), $r_t$ represents a reward function at time t, $r_1$ represents a safety distance reward function, $r_2$ represents a comfort reward function, and $r_3$ represents a penalty function.

Firstly, a safety distance reward function $r_1$ is designed:

$$r_1 = \begin{cases} \omega_d(L_r - L_s) & L_r \geq L_s \\ 0 & L_r > L_s \end{cases} \quad (6)$$

in formula (6), $L_r$ and $L_s$ respectively represent relative vehicle distance and a safety distance threshold, and $\omega_d$ represents a safety distance weight coefficient valued as $\omega_d$=0.85 in the present invention.

Secondly, in order to ensure the driving comfort of the vehicle, excessive impact should be avoided as much as possible, and a comfort reward function $r_2$ is designed:

$$r_2=\omega_j|a_{F\_lon}(t+1)-a_{F\_lon}(t)| \quad (7)$$

in formula (7), $\omega_j$ is a comfort weight coefficient valued as $\omega_j$=0.95 in the present invention.

Finally, a penalty function $r_3$ is designed:

$$r_3 \begin{cases} -100, \text{ collision} \\ -100, \text{ rollover} \\ 0, \text{ no collision or rollover} \end{cases} \quad (8)$$

(4) An Expected Maximum Policy is Designed.

$$\pi^* = \underset{\pi_\theta}{\text{argmax}} E_{\tau(\pi_\theta)} * \left[\sum_{t=0} \gamma_t r_t\right] \quad (9)$$

in formula (9), $\pi^*$ is an expected maximum policy, $\pi$ is a backward anti-collision decision-making policy, $\gamma$ is a discount factor, $\gamma \in (0,1)$, and $\tau(\pi)$ represents trajectory distribution under policy $\pi$.

Figure 2:
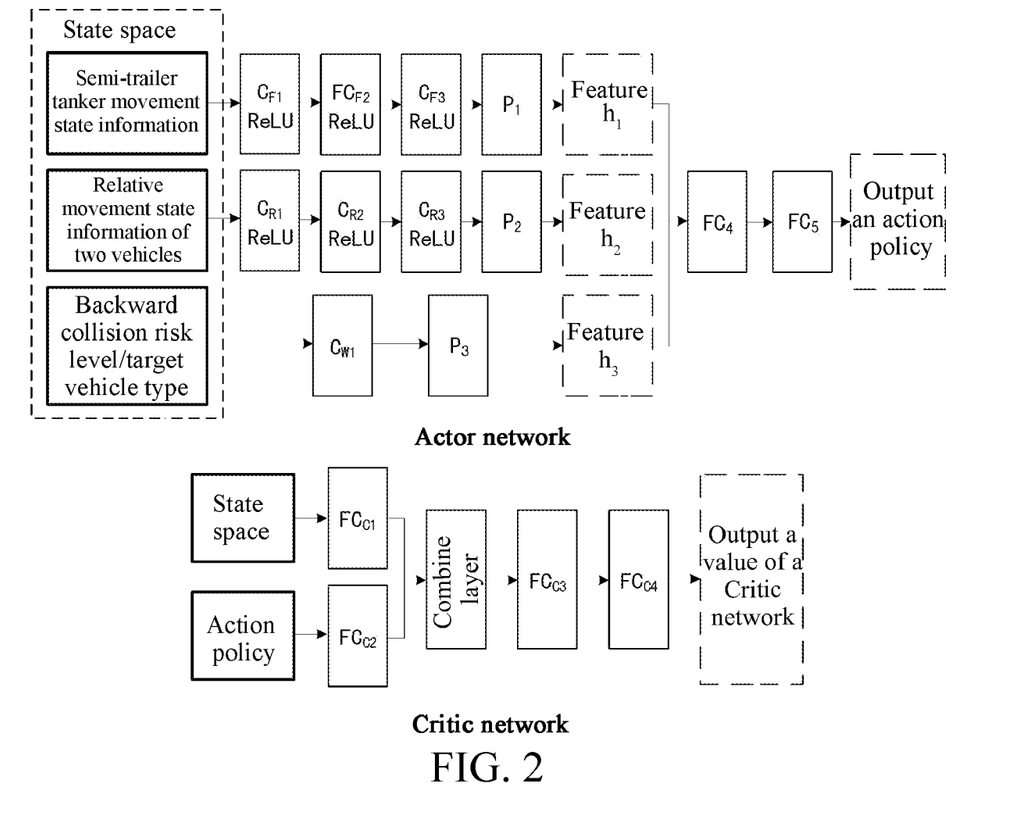
FIG. 2 is a schematic diagram of a network architecture of a backward anti-collision driving decision-making model established according to the present invention.

Sub-Step 2: A Network Architecture of the Backward Anti-Collision Driving Decision-Making Model is Designed.

A backward anti-collision driving decision-making network is set up by using an "Actor-Critic" network framework, including an Actor network and a Critic network. The Actor network uses state space information as an input and outputs an action decision, that is, the throttle opening and steering wheel angle control quantities of the heavy commercial vehicle. The Critic network uses the state space information and the action decision as an input and outputs a value of current "state-action". The network architecture is as illustrated in FIG. 2. The specific steps are as follows:

(1) An Actor Network is Designed.

A hierarchical coder structure is established and features of various information in the state space are respectively extracted. Firstly, 3 serially connected convolution layers ($C_{F1}$, $C_{F2}$, $C_{F3}$) and 1 maximum pooling layer ($P_1$) are constructed, features of the movement state information (longitudinal velocity, longitudinal acceleration, steering wheel angle, and throttle opening) of the vehicle are extracted, and they are coded into an intermediate feature vector $h_1$; features of the relative movement state information (relative longitudinal velocity, relative longitudinal acceleration, and relative vehicle distance) of the two vehicles are extracted by using the same structure, that is, 3 serially connected convolution layers ($C_{R1}$, $C_{R2}$, $C_{R3}$) and 1 maximum pooling layer ($P_2$), and they are coded into an intermediate feature vector $h_2$; and features of the collision risk level and the type of the target vehicle are extracted by using a convolution layer $C_{W1}$ and a maximum pooling layer $P_3$, and they are coded into an intermediate feature vector $h_3$.

Secondly, the features $h_1$, $h_2$ and $h_3$ are combined and full connection layers $FC_4$ and $FC_5$ are connected to output the action decision.

The number of neurons of the convolution layers $C_{F1}$, $C_{F2}$, $C_{F3}$, $C_{R1}$, $C_{R2}$, $C_{R3}$ and $C_{W1}$ is set to be 20, 20, 10, 20, 20, 10 and 20 respectively; the number of neurons of the full connection layers $FC_4$ and $FC_5$ is set to be 200. The activation function of each convolution layer and full connection layer is a Rectified Linear Unit (ReLU), and an expression thereof is f(x)=max(0, x)

(2) A Critic Network is Designed.

A Critic network is established by using a neural network with a multiple hidden layer structure. Firstly, a state space $S_t$ is input into a hidden layer $FC_{C1}$; and at the same time, an action decision $A_t$ is input into a hidden layer $FC_{C2}$. Secondly, the hidden layers $FC_{C1}$ and $FC_{C2}$ are combined by tensor addition. Finally, after passing through the full connection layers $FC_{C3}$ and $FC_{C4}$ sequentially, a value of the Critic network is output.

The number of neurons of the layers $FC_{C1}$ and $FC_{C2}$ is set to be 400, the number of neurons of other hidden layers is set to be 200, and the activation function of each layer is an ReLU.

Sub-Step 3: The Backward Anti-Collision Driving Decision-Making Model is Trained.

Gradient updating is performed to the network parameters by using loss functions $J_{actor}$ and $J_{critic}$. A specific training process is as follows:

Sub-step 3.1: the Actor network and the Critic network are initialized.

Sub-step 3.2: iterative solution is performed, wherein each iteration includes sub-step 3.21 to sub-step 3.4 specifically as follows:

Sub-step 3.21: iterative solution is performed, wherein each iteration includes sub-step 3.211 to sub-step 3.213 specifically as follows:

Sub-step 3.211: a movement control operation of the vehicle is obtained by using the virtual traffic environment model in step I.

Sub-step 3.212: sample data $(S_t, A_t, r_t)$ are obtained by using the Actor network.

Sub-step 3.213: a cycle is ended to obtain a sample point set $[(S_1, A_1, r_1), (S_2, A_2, r_2), \ldots, (S_t, A_t, r_t)]$.

Sub-step 3.22: an advantage function is calculated:

$$\hat{F}_t = \sum_{t'>t} \gamma^{t'-1} r_{t'} - V(S_t) \quad (10)$$

in formula (10), $\hat{F}_t$ represents an advantage function at time t, V ($S_t$) represents a value function of state $S_t$, $\hat{F}_t > 0$ represents that the possibility of taking a current action should be increased, and $\hat{F}_t < 0$ represents that the possibility of taking the action should be decreased.

Sub-step 3.23: iterative solution is performed, wherein each iteration includes sub-step 3.231 to sub-step 3.233 specifically as follows:

Sub-step 3.231: an objective function of the Actor network is calculated.

Sub-step 3.232: the parameter $J_{actor}$ of the Actor network is updated:

$$J_{actor} = \sum_{(s_1, a_1)} \min\left[p_t(\theta)\hat{F}, \text{clip}(p_t(\theta), 1-\varepsilon, 1+\varepsilon)\hat{F}_t\right] \quad (11)$$

in formula (11), $p_t(\theta)$ represents a ratio of a new policy $\pi_\theta$ to an old policy $\pi_{\theta\_old}$ on action decision distribution in a policy updating process, $$p_t(\theta) = \frac{\pi_\theta(A_t \mid S_t)}{\pi_{\theta\_old}(A_t \mid S_t)}, \text{clip}(\cdot)$$

represents a clipping function, and $\varepsilon$ is a constant valued as $\varepsilon=0.25$ in the present invention.

Sub-step 3.233: the parameter $J_{critic}$ of the Critic network is updated:

$$J_{critic} = -\sum_{t=1}^{T}\left[\sum_{t'>t} \gamma^{t'-1} r_{t'} - V(S_t)\right]^2 \quad (12)$$

Sub-step 3.234: a cycle is ended.

Sub-step 3.3: iterative updating is performed according to the method provided in sub-step 3.2 to make the Actor network and the Critic network converge gradually. In a training process, if the vehicle has a backward collision or rollover, a current round is terminated and a new round for training is started. When the iteration reaches the maximum number of steps or the model is capable of making a backward anti-collision driving decision stably and accurately, the training ends.

Sub-Step 4: The Decision-Making Policy is Output by Using the Backward Anti-Collision Decision-Making Model.

The information obtained by the centimeter-level high-precision differential GPS, the inertia measurement unit, the millimeter wave radar and the CAN bus is input into the trained backward anti-collision driving decision-making model, such that proper steering wheel angle and throttle opening control quantities are capable of being quantitatively output to provide an effective and reliable backward anti-collision driving suggestion for a driver, so as to realize effective, reliable and adaptive backward anti-collision driving decision-making of the heavy commercial vehicle.

What is claimed is:

1. A backward anti-collision driving decision-making method for a heavy commercial vehicle, wherein the method comprises the following steps:

step I: establishing a virtual traffic environment model: for high-class highways, establishing a virtual traffic environment model, that is, a three-lane virtual environment model comprising straight lanes and curved lanes, wherein the heavy commercial vehicle moves in the traffic environment model, a target vehicle follows the heavy commercial vehicle, and in the process there are 4 different running conditions, comprising acceleration, deceleration, uniform velocity and lane change;

in a process of establishing the virtual traffic environment model, vehicle movement state information is obtained in real time through a centimeter-level high-precision differential GPS, an inertia measurement unit and a millimeter wave radar mounted on each vehicle, comprising positions, velocity, acceleration, relative distance and relative velocity of the two vehicles; a type of the target vehicle is obtained in real time through a visual sensor mounted at a rear part of the vehicle; and drivers control information is read through a CAN bus, comprising a throttle opening and a steering wheel angle of the vehicle;

the target vehicle refers to a vehicle located behind the heavy commercial vehicle on a running road, located within the same lane line, running in the same direction and closest to the heavy commercial vehicle, including 3 types: small, medium and large vehicles;

step II: establishing a backward collision risk assessment model, specifically comprising:

firstly, calculating time required for collision between the heavy commercial vehicle and the target vehicle:

$$RTTC(t) = -\frac{x_c(t)}{v_r(t)} \quad (1)$$

in formula (1), RTTC(t) represents backward distance collision time at time t in unit of second, $x_c(t)$ represents vehicle distance in unit of meter, $v_F(t)$ and $v_R(t)$ respectively represent the velocity of the heavy commercial vehicle and the target vehicle, $v_r(t)$ represents the relative velocity of the two vehicles in unit of meter per second, and $v_r(t)=v_F(t)-v_R(t)$;

secondly, calculating a backward collision risk level; when the backward distance collision time is not less than 2.1 seconds and not more than 4.4 seconds, giving a backward collision alarm, indicating that a backward collision early warning system has passed a test; and based on this, quantifying the backward collision risk level:

$$\delta_w = \frac{RTTC(t) - 2.1}{4.4 - 2.1} \quad (2)$$

in formula (2), $\delta_w$ represents a quantified value of a backward collision risk; when $\delta_w \geq 1$, it indicates that there is no backward collision risk; when $0.5 \leq \delta_w \leq 1$, it indicates that there is a backward collision risk; and when $0 \leq \delta_w \leq 0.5$, it indicates that the backward collision risk level is very high;

step III: establishing a backward anti-collision driving decision-making model of the heavy commercial vehicle: comprehensively considering the influence of traffic environment, vehicle operation state, rear vehicle type and backward collision risk level on backward collision, establishing a backward anti-collision driving decision-making model of the heavy commercial vehicle by adopting a PPO algorithm, and performing interactive iterative learning with a target vehicle movement random process model to obtain an optimal backward anti-collision decision, specifically comprising the following 4 sub-steps:

sub-step 1: defining basic parameters of the backward anti-collision driving decision-making model firstly, describing a backward anti-collision driving decision-making problem as a Markov decision-making process (S,A,P,r) under a certain reward function, wherein S is a state space, A is a backward anti-collision action decision, P is a state transition probability caused by movement uncertainty of the target vehicle, and r is a reward function; and secondly, defining basic parameters of the Markov decision-making process, specifically comprising:

(1) defining a state space
establishing a state space expression by using the vehicle movement state information output in step I and the backward collision risk level output in step II:

$$S_t = (v_{F\_lon}, a_{F\_lon}, v_{r\_lon}, a_{r\_lon}, \theta_{str}, p_{thr}, L_r, \delta_w, T_m) \quad (3)$$

In formula (3), $S_t$ represents a state space at time t, $v_{F\_lon}$ and $v_{r\_lon}$ respectively represent the longitudinal velocity of the heavy commercial vehicle and the relative longitudinal velocity of the two vehicles in unit of meter per second, $a_{F\_lon}$ and $a_{r\_lon}$ respectively represent the longitudinal acceleration of the heavy commercial vehicle and the relative longitudinal acceleration of the two vehicles in unit of meter per square second, $\theta_{str}$ represents a steering wheel angle of the vehicle in unit of degree, $p_{thr}$ represents a throttle opening in unit of percentage, $L_r$ represents a relative vehicle distance in unit of meter, $\delta_w$ and $T_m$ respectively represent the backward collision risk level and the type of the target vehicle, m=1, 2, 3 respectively represent that the target vehicle is a large vehicle, a medium vehicle and a small vehicle, and $T_m$=m in the present invention;

(2) defining an action decision
in order to comprehensively consider the influence of transverse movement and longitudinal movement on backward collision, defining a driving policy, that is, an action decision output by the decision-making model, by using the steering wheel angle and the throttle opening as control quantities in the present invention:

$$A_t = [\theta_{str\_out}, p_{thr\_out}] \quad (4)$$

in formula (4), $A_t$ represents an action decision at time t, $\theta_{str\_out}$ represents a normalized steering wheel angle control quantity in a range of [−1, 1], and $p_{thr\_out}$ represents a normalized throttle opening control quantity in a range of [0, 1]; and when $p_{thr\_out}=0$, it indicates that the vehicle does not accelerate, and when $\delta_{brake}=1$, it indicates that the vehicle accelerates at a maximum acceleration;

(3) establishing a reward function
in order to evaluate the advantages and disadvantages of the action decision, establishing a reward function to concretize and digitalize the evaluation; and considering that backward anti-collision driving decision-making is a multi-objective optimization problem involving safety, comfort and other objectives, designing the reward function as follows:

$$r_t = r_1 + r_2 + r_3 \quad (5)$$

in formula (5), $r_t$ represents a reward function at time t, $r_1$ represents a safety distance reward function, $r_2$ represents a comfort reward function, and $r_3$ represents a penalty function:

firstly, designing a safety distance reward function $r_1$:

$$r_1 = \begin{cases} \omega_d(L_r - L_s) & L_r \geq L_s \\ 0 & L_r > L_s \end{cases} \quad (6)$$

in formula (6), $L_r$ and $L_s$ respectively represent relative vehicle distance and a safety distance threshold, $\omega_d$ represents a safety distance weight coefficient, valued as $\omega_d=0.85$ in the present invention;

secondly, designing a comfort reward function $r_2$:

$$r_2 = \omega_j |a_{F\_lon}(t+1) - a_{F\_lon}(t)| \quad (7)$$

in formula (7), $\omega_j$ is a comfort weight coefficient, valued as $\omega_j=0.95$ in the present invention;

finally, designing a penalty function $r_3$:

$$r_3 \begin{cases} -100, \text{ collision} \\ -100, \text{ rollover} \\ 0, \text{ no collision or rollover} \end{cases} \quad (8)$$

(4) designing an expected maximum policy $$\pi^* = \underset{\pi_\theta}{\arg\max} E_{\tau(\pi_\theta)}\left[\sum_{k=0} \gamma_t r_t\right] \quad (9)$$

in formula (9), π* is an expected maximum policy, π is a backward anti-collision decision-making policy, γ is a discount factor, γ∈(0,1), and τ(π) represents trajectory distribution under policy π;

sub-step 2: designing a network architecture of the backward anti-collision driving decision-making model
setting up a backward anti-collision driving decision-making network by using an "Actor-Critic" network framework, comprising an Actor network and a Critic network, wherein the Actor network uses state space information as an input and outputs an action decision, that is, the throttle opening and steering wheel angle control quantities of the heavy commercial vehicle; the Critic network uses the state space information and the action decision as an input, and outputs a value of current "state-action", specifically comprising:

(1) designing an Actor network
establishing a hierarchical coder structure and respectively extracting features of various information in the state space; firstly, constructing 3 serially connected convolution layers ($C_{F1}$, $C_{F2}$, $C_{F3}$) and 1 maximum pooling layer ($P_1$), extracting features of the movement state information (longitudinal velocity, longitudinal acceleration, steering wheel angle, and throttle opening) of the vehicle, and coding them into an intermediate feature vector $h_1$; extracting features of the relative movement state information (relative longitudinal velocity, relative longitudinal acceleration, and relative vehicle distance) of the two vehicles by using the same structure, that is, 3 serially connected convolution layers ($C_{R1}$, $C_{R2}$, $C_{R3}$) and 1 maximum pooling layer ($P_2$), and coding them into an intermediate feature vector $h_2$; extracting features of the collision risk level and the type of the target vehicle by using a convolution layer $C_{W1}$ and a maximum pooling layer $P_3$, and coding them into an intermediate feature vector $h_3$; and secondly, combining the features $h_1$, $h_2$ and $h_3$ and connecting full connection layers $FC_4$ and $FC_5$ to output the action decision,
wherein the number of neurons of the convolution layers $C_{F1}$, $C_{F2}$, $C_{F3}$, $C_{R1}$, $C_{R2}$, $C_{R3}$ and $C_{W1}$ is set to be 20, 20, 10, 20, 20, 10 and 20 respectively; the number of neurons of the full connection layers $FC_4$ and $FC_5$ is set to be 200; the activation function of each convolution layer and full connection layer is a Rectified Linear Unit (ReLU), and an expression thereof is f(x)=max (0, x);

(2) designing a Critic network
establishing a Critic network by using a neural network with a multiple hidden layer structure; firstly, inputting a state space $S_t$ into a hidden layer $FC_{C1}$; at the same time, inputting an action decision $A_t$ into a hidden layer $FC_{C2}$; secondly, combining the hidden layers $FC_{C1}$ and $FC_{C2}$ by tensor addition; and finally, after passing through the full connection layers $FC_{C3}$ and $FC_{C4}$ sequentially, outputting a value of the Critic network, wherein the number of neurons of the layers $FC_{C1}$ and $FC_{C2}$ is set to be 400, the number of neurons of other hidden layers is set to be 200, and the activation function of each layer is an ReLU;

sub-step 3: training the backward anti-collision driving decision-making model performing gradient updating to the network parameters by using loss functions $J_{actor}$ and $J_{critic}$ wherein a specific training process is as follows:
sub-step 3.1: initializing the Actor network and the Critic network;
sub-step 3.2: performing iterative solution, wherein each iteration comprises sub-step 3.21 to sub-step 3.4 specifically as follows:
sub-step 3.21: performing iterative solution, wherein each iteration comprises sub-step 3.211 to sub-step 3.213 as follows:
sub-step 3.211: obtaining a movement control operation of the vehicle by using the virtual traffic environment model in step I;
sub-step 3.212: obtaining sample data ($S_t$,$A_t$,$f_t$) by using the Actor network;
sub-step 3.213: ending a cycle to obtain a sample point set [($S_1$,$A_1$,$r_1$), ($S_2$,$A_2$,$r_2$), ..., ($S_t$,$A_t$,$r_t$)];
sub-step 3.22: calculating an advantage function:

$$\hat{F}_t = \sum_{t'>t} \gamma^{t'-1} r_{t'} - V(S_t) \quad (10)$$

in formula (10), $\hat{F}_t$ represents an advantage function, $V(S_t)$ represents a value function of state $S_t$, $\hat{F}_t>0$ represents that the possibility of taking a current action should be increased, and $\hat{F}_t<0$ represents that the possibility of taking the action should be decreased;
sub-step 3.23: performing iterative solution, wherein each iteration comprises sub-step 3.231 to sub-step 3.233 specifically as follows:
sub-step 3.231: calculating an objective function of the Actor network;
sub-step 3.232: updating the parameter $J_{actor}$ of the Actor network:

$$J_{actor} = \sum_{(s_1,a_1)} \min\left[p_t(\theta)\hat{F}, \text{clip}(p_t(\theta), 1-\varepsilon, 1+\varepsilon)\hat{F}_t\right] \quad (11)$$

in formula (11), $p_t(\theta)$ represents a ratio of a new policy $\pi^\theta$ to an old policy $\pi_{\theta\_old}$ on action decision distribution in a policy updating process, $$p_t(\theta) = \frac{\pi_\theta(A_t\mid S_t)}{\pi_{\theta\_old}(A_t\mid S_t)},$$

clip(•) represents a clipping function, and ε is a constant valued as ε=0.25;
sub-step 3.233: updating the parameter $J_{critic}$ of the Critic network:

$$J_{critic} = -\sum_{t=1}^{T}\left[\sum_{t'>t} \gamma^{t'-1} r_{t'} - V(S_t)\right]^2 \quad (12)$$

sub-step 3.234: ending a cycle;
sub-step 3.3: performing iterative updating according to the method provided in sub-step 3.2 to make the Actor network and the Critic network converge gradually, wherein in a training process, if the vehicle has a backward collision or rollover, a current round is terminated and a new round for training is started; and when the iteration reaches the maximum number of steps or the model is capable of making a backward anti-collision driving decision stably and accurately, the training ends;

sub-step 4: outputting the decision-making policy by using the backward anti-collision decision-making model inputting the information obtained by the centimeter-level high-precision differential GPS, the inertia measurement unit, the millimeter wave radar and the CAN bus into the trained backward anti-collision driving decision-making model, such that proper steering wheel angle and throttle opening control quantities are capable of being quantitatively output to provide an effective and reliable backward anti-collision driving suggestion for a driver, so as to realize effective, reliable and adaptive backward anti-collision driving decision-making of the heavy commercial vehicle.

\* \* \* \* \*